Figure 1:
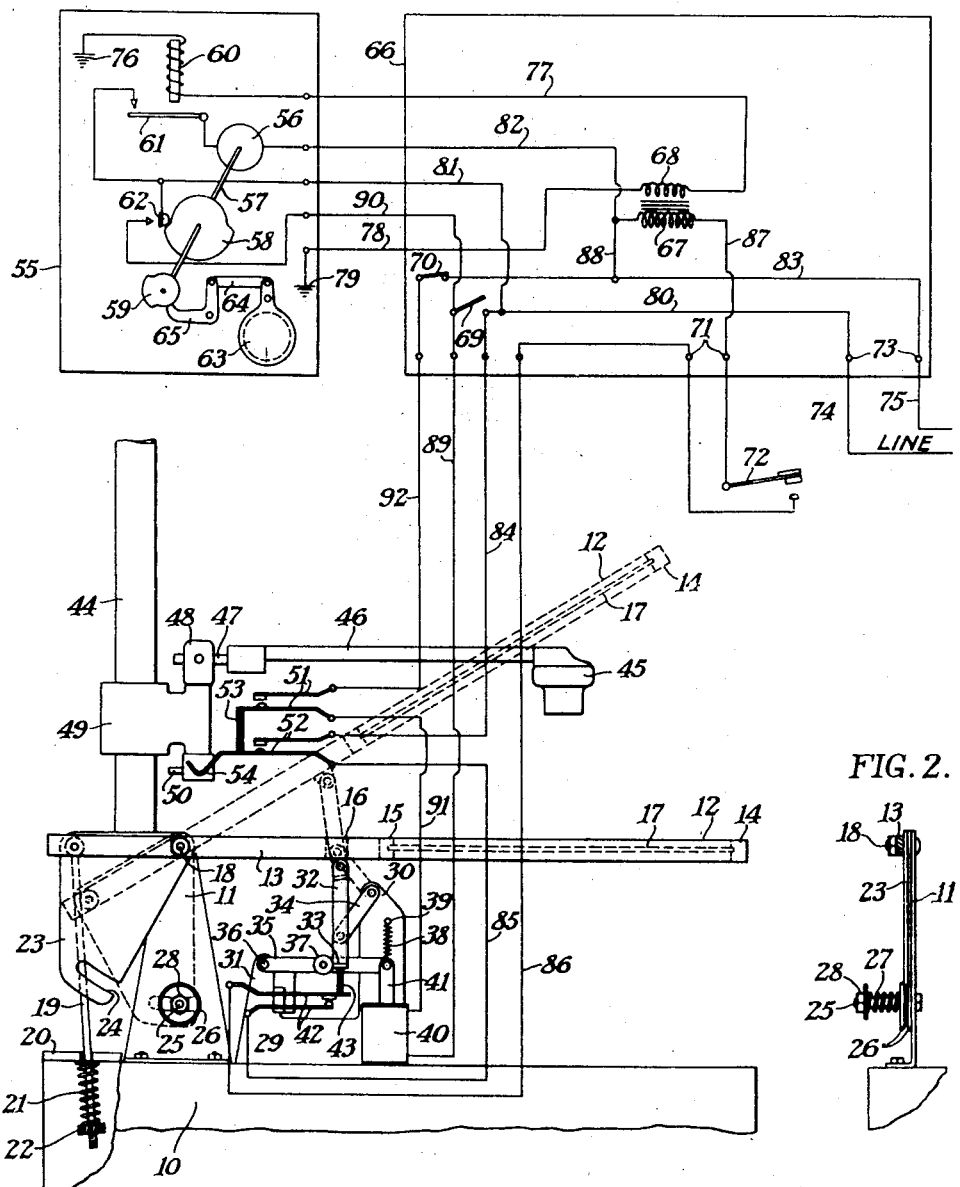

June 6, 1944.    A. E. SCHUBERT ET AL    2,350,831
CONTROL FOR PHOTOGRAPHIC COPYING APPARATUS
Filed Oct. 5, 1943

ALVIN E. SCHUBERT
ELMER O. WANGERIN
JOHN F. EGAN
INVENTORS

BY
ATTORNEY

Patented June 6, 1944

2,350,831

UNITED STATES PATENT OFFICE 2,350,831

CONTROL FOR PHOTOGRAPHIC COPYING APPARATUS

Alvin E. Schubert, Elmer O. Wangerin, and John F. Egan, Rochester, N. Y., assignors to Eastman Kodak Company, Rochester, N. Y., a corporation of New Jersey Application October 5, 1943, Serial No. 505,018

12 Claims. (Cl. 88—24)

The present invention relates to a photographic copying apparatus and more particularly to a control means therefor.

A photographic copying apparatus for copying documents or pages from bound volumes generally comprises a camera containing the sensitive film and a copyholder for holding the document or volume page to be photographed in the focal plane of the camera objective. Such copyholders preferably include a platen member which may consist of a transparent plate or open frame against which the copy is pressed and which platen member is opened for insertion or removal of the document. In order to obtain the optimum photographic quality and results in the photographic copy it is desirable to utilize certain auxiliary devices for determining the proper exposure, focus, alignment etc. and such determinations are best made by placing the auxiliary device directly over the copy and also over the platen member of the copyholder. Certain difficulties or dangers are introduced by the use of such auxiliary devices because the operator may neglect or forget to remove the auxiliary device from its position over the copyholder and upon release of the platen member either the auxiliary device or platen member or both may be damaged or the auxiliary device may be photographed to obliterate part of the copy.

The primary object of the present invention is the provision of control means for a photographic copying apparatus and adapted and arranged so that the platen member of the copyholder can not be opened while the auxiliary device is over the same and so that a camera exposure can not be made and the platen member can not be released while the auxiliary device is over the copyholder.

Another object of the invention is the provision of a control means so that the copying camera can not be operated unless the platen member of the copyholder is closed or in operative position.

A further object of the invention is the provision of a control system for a photographic copying apparatus whereby the platen member is automatically released after each camera exposure but adapted so that several camera exposures can be made without release of the platen member and also adapted so that the platen member may be released without a camera exposure being made.

Other and further objects of the invention will be obvious to those skilled in the art from the disclosure which follows:

The above and other objects of the invention are embodied in a photographic copying apparatus comprising a camera having a cycle of operations, a copyholder including a platen member movable to operative and inoperative positions, a platen release means for holding said platen member in operative position and when actuated permitting movement of the platen to its inoperative position, a switch means responsive to movement of the platen member to operative position, an auxiliary device mounted for movement to an operative position in the path of the movement of said platen member and movable to an inoperative position out of said path of movement of the platen member, a pair of switch assemblies responsive to movement of said auxiliary device to its operative position, a camera control circuit including the platen operated switch means and one of said switch assemblies, and a platen control circuit including a camera operated switch and the other of said switch assemblies.

Reference is hereby made to the accompanying drawing wherein Fig. 1 is a side elevation of a photographic copying apparatus and particularly the copyholder thereof and includes a wiring diagram and a diagrammatic illustration of the copying camera.

Figure 2:
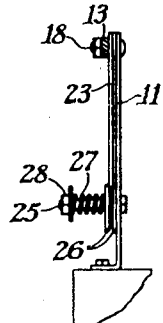

Fig. 2 is a fragmentary rear elevation of the brake means for the platen member.

As previously indicated, the auxiliary device within the scope of the invention may be a photosensitive cell, a lens or other instrumentality for aiding in the photographic process and although a photosensitive cell is referred to in this description it is to be understood that the invention is of equal value for use with other auxiliary devices. Inasmuch as the copying camera is of well known construction it has been illustrated only diagrammatically and inasmuch as copyholder constructions are also well known, only the platen member and brake means therefor have been illustrated.

In the illustrated embodiment the photographic copying apparatus is mounted upon a base 10 to which platen supports 11 are attached. The platen member 12 comprises a frame including side bars 13 and cross-bars 14, 15 and 16 and a transparent plate 17 mounted between said side bars 13 and cross-bars 14 and 15. Said platen member is preferably pivotally mounted by means of bolts 18 extending through side bars 13 and the upper ends of supports 11. Rods 19 are pivotally connected at one end to the rear ends of side bars 13, extend through the cover plate 20 and into base 10, and carry upon the other end a coil spring 21 and knurled nut 22. The action of the coil springs 21 is to lower the rear ends of side bars 13 and raise the platen member to the dotted line position shown.

A platen brake means comprises a pair of plate sectors 23 each provided with an arcuate notch 24 having its center coinciding with the pivotal axis around bolts 18 and fastened to side bars 13 on the opposite side of the platen pivot from the transparent plate 17. A stud 25 is mounted in and extends through support 11 and carries a pair of washers 26, a coil spring 27 and nut 28 for adjusting the tension in coil spring 27 and its pressure against one of washers 26. Said washers 26 are positioned so as to frictionally engage the sides of plate sectors 23 and dampen the movement of the platen member, slot 24 being provided in sectors 23 to receive stud 25 during such braking period.

A platen release means comprises a linkage, a holding member therefor and means for releasing said holding member. Said platen release means is mounted upon a support 29 fastened to base 10 and having a projection 30 and a bracket portion 31. A link 32 is pivoted at its upper end to the platen member and preferably to the cross-bar 16 thereof, and has an abutment 33 at its other end. A link 34 is pivoted at one end to the projection 30 and at its other end intermediately to the link 32. The holding means comprises a lever 35 pivotally mounted by a pin 36 to bracket portion 31 of support 29 and a roller 37 intermediately mounted thereon. A spring 38 has one end attached to the free end of lever 35 and its other end attached to the pin 39 on projection 30 of support 29. A solenoid 40 is mounted upon support 29 and has its plunger or armature 41 pivotally connected to said free end of lever 35.

The operation of the platen member and platen release means is as follows: The platen member is normally in inoperative or raised position shown by dotted lines in Fig. 1 at which time the platen sectors 23 are frictionally engaged by the spring pressed washers 26 and the links 32 and 34 are in a partially extended position also indicated by dotted lines in Fig. 1. The operator manually closes or moves the platen member to its operative position. During the first portion of such closing movement the platen sectors 23 move out of frictional engagement with the spring pressed washers 26 so that the remaining manual movement of the platen member is resisted only by the action of coil springs 21. When the platen member reaches its closed or operative position shown by full lines in Fig. 1, the abutment 33 engages the roller 37 on lever 35 and the action of spring 38 holds said roller in blocking position with respect to said abutment 33 and the platen member is releasably locked in its operative, closed and horizontal position. Upon energization of solenoid 40 the plunger 41 is attracted to overcome spring 38 and move lever 35 so that the roller 37 is disengaged from the abutment 33 on link 32. The action of coil springs 21 now rapidly raises the platen member 12 and plate sectors 23 engage the spring pressed washers 26 which create a smooth but effective dampening action upon the platen member. Nuts 28 may be adjusted to change the tension of spring 27 and frictional engagement of the washers 26 with sectors 23 to vary the dampening action of the brake means upon the platen member. In this manner the effort to close the platen member is reduced and correspondingly lessens the work done by the operator to close the platen member and diminishes the likelihood of fatiguing the operator. At the same time, the dampening action on the platen member is not affected and the rapid initial movement of the platen member reduces the time for the platen member to open, thereby increasing the speed at which the copying machine may be operated.

A switch means responsive to movement of the platen member to operative position may be variously located for such purpose. Preferably, such switch means is mounted upon support 29 and comprises a pair of contact arms 42 which are normally open and an insulating pin 43 having one end located to be engaged by abutment 33 when the platen member is moved to operative position and having its other end adapted to close the contact arms 42. Thus, the platen operated switch means is open when the platen member 12 is in inoperative position and is closed when said platen member 12 is in operative position.

The auxiliary device and copying camera are mounted above the copyholder upon a vertical column 44 which extends upwardly from base 10. The auxiliary device, such as a photo-sensitive cell 45, is mounted upon one end of an arm 46 having its other end fastened by a rod 47 to a pivot post 48. Said pivot post 48 is journaled in a bracket 49 mounted on column 44 and carries a switch operating pin 50. A pair of switch assemblies are adapted and arranged so as to be operated by movement of the auxiliary device or support therefor. Said switch assemblies 51 and 52 comprise normally open contact arms. An insulating pin 53 engages one of the contact arms of each of switches 51 and 52 for simultaneous opening and closing thereof and a cam portion 54 extends from one of switch assemblies 51 or 52 into position for actuation by switch operating pin 50. As a result, when the auxiliary device or photosensitive cell 45 is in its operative position over the platen member 12 switches 51 and 52 are both open. However, when the auxiliary device or photosensitive cell 45 is moved to its inoperative position the switch operating pin 50 moves cam portion 54 to close both of switches 51 and 52.

For best results, the auxiliary device which may be utilized or photosensitive cell 45 should in operative position be fairly close to the platen member in its closed position. This requirement means that the auxiliary device or photosensitive cell 45 in its operative position is in the path of the movement of the platen member 12 when it moves from operative to inoperative position. Obviously, if the auxiliary device is not moved out of the path of the platen member 12 then the delicate photosensitive cell 45, or fragile transparent plate 17 of the platen member, or both, may be damaged if the platen member 12 is released while the auxiliary device is over said platen member. Likewise, it is necessary to move the auxiliary device out of its operative position so that a photograph of the auxiliary device will not be made by the copying camera or so that the auxiliary device will not intercept or obliterate part of the image of the document to be copied. These protective or interlocking functions are obtained by the switches 51 and 52 in a manner to be explained hereinafter.

The copying camera is of conventional or standard design and the Micro-File Recordak Camera Model C is quite suitable for all purposes of the invention. The copying camera 55 is shown only diagrammatically and includes an electric motor 56 driving a shaft 57, a switch cam 58 and a shutter cam 59 on said shaft 57. A solenoid 60 is arranged to close the normally open camera operating switch 61 and a normally open platen release switch 62 is adapted to be closed by switch cam 58. A shutter 63 is adapted normally to close the path to the sensitive film in the camera and is connected by a link 64 to a bell crank 65 which is adapted to be operated by the rise on the shutter cam 59. The sequence of operations within the camera is preferably energization of the solenoid to close camera operating switch 61, and energizing motor 56 which rotates shaft 57 in a clockwise direction whereupon shutter cam 59 opens shutter member 63 for the exposure and subsequently switch cam 58 closes the platen release switch 62 to release the platen member if other conditions are satisfied. Of course, the film advancement and other incidents of the cycle of camera operations may be timed as desired and preferably occur after the exposure and/or during closure of the platen release switch 62.

The remainder of the control means may be incorporated into a control unit 66 also shown diagrammatically and including a transformer having a primary winding 67 and a secondary winding 68, a manually operated release switch 69 and a manually operated switch 70 for preventing automatic release of the platen upon operation of the camera. Said control unit 66 has a pair of terminals 71 to which a master switch 72 is connected. Said master switch 72 is preferably provided in the form of a foot operated switch which can be placed on the floor under or near the copying apparatus. Said control unit 66 also has a pair of terminals 73 to which the legs 74 and 75 of the electric supply line are connected.

The control means responsive to the position of the auxiliary device and/or to the platen position may be provided in several ways. A preferred form of such control means has a platen control circuit and a camera control circuit. A camera operating circuit is also provided but the camera may be operated in other ways such as manually or by a spring motor.

A camera operating control circuit may extend from a ground 76 through solenoid 60, wire 77, the transformer secondary 68 and wire 78 to a ground 79 in the camera 55. A camera operating circuit extends from leg 74 of the electric supply line through one of terminals 73 through wires 80 and 81, through the camera operating switch 61, through motor 56, through wires 82 and 83 to the other terminal 73 and the leg 75 of the electric supply line.

The camera control circuit according to the illustrated embodiment of the invention extends from leg 74, through one of terminals 73, wires 80 and 84, through switch 52, wire 85, through contact arms 42, through a wire 86, through one of terminals 71, through foot switch 72, through the other of terminals 71, through a wire 87, through the transformer primary 67 and wires 88 and 83 to the leg 75 of the supply line. If switch 52 is open, on account of the auxiliary device or photosensitive cell 45 being in the path of movement of the platen member or if contact arms 42 are not closed on account of the platen member being in inoperative position, said camera control circuit will not be completed. In other words, the auxiliary device must be out of the path of the platen member and out of the field of the copying camera and the platen member must be in operative position before the camera control circuit can be completed. When said camera control circuit is completed transformer secondary 68 and solenoid 60 of the camera operating control circuit are energized, camera operating switch 61 is closed and the motor 56 is placed across the legs 74 and 75 of the electric supply line. Operation of said motor 56 rotates shaft 57, shutter cam 59 opens and closes shutter member 63 for an exposure. Subsequently, switch cam 58 closes the platen release switch 62 to close the platen control circuit if certain conditions are satisfied.

The platen control circuit extends from leg 74 of the supply line through one of terminals 73, through wires 80 and 81, through the camera operated platen release switch 62, through wires 90 and 89 to solenoid 40, through a wire 91 to switch 51, through a wire 92, manually operable switch 70, wire 83 and the other terminal 73 to the leg 75 of the electric supply line. Thus, during the latter portion of the camera cycle cam 58 closes switch 62 automatically to complete the platen release circuit if the auxiliary device or photosensitive cell 45 is out of the path of movement of the platen member in which event the switch 51 is closed for completion of said platen release circuit. The manually operable platen release switch 69 is arranged to shunt that portion of the platen control circuit extending through the copying camera 55 so that the operator may close switch 69, energize solenoid 40 to actuate the platen release means without operation of the camera but such release of the platen will take place only if switch 51 is closed and the auxiliary device is out of the path of the platen member. On the other hand, it is often required that several copies be made of the same document and it is desired not to release the platen member for each cycle of operations of the copying camera. To obtain this object manually operable switch 70 is opened and each actuation of the master or foot switch 72 merely causes performance of a camera cycle without automatic opening of the platen member during the latter portion of such cycle.

From an inspection of the circuit it will be seen that if only switch 52 were used it would not be possible to operate the camera and hence impossible to operate the platen release switch while the auxiliary device was over the platen. However, without switch 51 and assuming its circuit to be closed it would be possible to close the manually operable platen switch 69 to release the platen member and cause it to strike the auxiliary device. Conversely, if switch 52 were eliminated it would not be possible to release the platen while the cell is over it. However, it would be possible to establish a current through the solenoid 60 causing the camera motor 56 to operate and make an exposure with the auxiliary device in the photographic field. These circumstances show that although the objects of the invention may be partially accomplished by the provision of either switches 51 or 52 there are still possibilities of interference between the platen member and auxiliary device or of photographing the auxiliary device. Consequently, complete attainment of the objects of the invention requires the provision of the camera control and platen control circuits in the manner disclosed.

Since the control means according to the invention for preventing improper operation of the photographic copying apparatus may be supplied, arranged or constructed in a wide variety of ways, the present disclosure is to be construed as illustrative. The scope of the invention is defined in the claims which follow.

Having now particularly described our invention, what we desire to secure by Letters Patent of the United States and what we claim is:

1. In a photographic copying apparatus, the combination with a camera including a motor, a pair of cams driven thereby, a normally open switch closed by one of said cams, and a shutter assembly operated by the other of said cams, a copy holder including a platen member normally in an inoperative position and movable to an operative position, a platen release means including a linkage, a holding member normally engaging said linkage when said platen member is in operative position, and a solenoid adapted when energized to disengage said holding member from said linkage and permit movement of said platen member to its inoperative position, a switch means closed upon movement of said platen member to operative position, a photosensitive device movable to an operative position in the path of movement of said platen member and movable to an inoperative position out of the path of movement of said platen member, a pair of switch assemblies closed upon movement of said photosensitive device to its inoperative position, a camera operating circuit including said motor, a camera control circuit including the platen operated switch means and one of said switch assemblies, a platen control circuit including said solenoid, said normally open switch in the camera and the other of said switch assemblies, and a master switch for closing said camera operating and control circuits.

2. In a photographic copying apparatus, the combination with a camera including a motor, a pair of cams driven thereby, a normally open switch closed by one of said cams, and a shutter assembly operated by the other of said cams, a copy holder including a platen member normally in an inoperative position and movable to an operative position, a platen release means including a linkage, a holding member normally engaging said linkage when said platen member is in operative position, and a solenoid adapted when energized to disengage said holding member from said linkage and permit movement of said platen member to its inoperative position, a switch means closed upon movement of said platen member to operative position, a photosensitive device movable to an operative position in the path of movement of said platen member and movable to an inoperative position out of the path of movement of said platen member, a pair of switch assemblies closed upon movement of said photosensitive device to its inoperative position, a camera control circuit including the platen operated switch means and one of said switch assemblies, and a platen control circuit including said solenoid, said switch in the camera and the other of said switch assemblies.

3. In a photographic copying apparatus, the combination with a camera including a motor, a pair of cams driven thereby, a normally open switch closed by one of said cams, and a shutter assembly operated by the other of said cams, a copy holder including a platen member normally in an inoperative position and movable to an operative position, a platen release means including a linkage, a holding member normally engaging said linkage when said platen member is in operative position, and a solenoid adapted when energized to disengage said holding member from said linkage and permit movement of said platen member to its inoperative position, a switch means closed upon movement of said platen member to operative position, a photosensitive device movable to an operative position in the path of movement of said platen member and movable to an inoperative position out of the path of movement of said platen member, a pair of switch assemblies closed upon movement of said photosensitive device to its inoperative position, a camera control circuit including the platen operated switch means and one of said switch assemblies, a platen control circuit including said solenoid, said switch in the camera and the other of said switch assemblies, and a master switch for closing said camera control circuit.

4. In a photographic copying apparatus, the combination with a camera, a copy holder including a platen member movable to an operative position and normally movable to an inoperative position, a release means for holding said platen member in operative position, and an auxiliary device movable to an operative position in the path of movement of said platen, of a control means responsive to the movement of said auxiliary device to operative position and for rendering said release means inoperative 5. In a photographic copying apparatus, the combination with a camera having a cycle of operation, a copy holder including a platen member movable to operative and inoperative positions, a platen release means for holding said platen in operative position, an auxiliary device movable to an operative position in the path of movement of said platen, of a platen control means responsive to movement of said auxiliary device to inoperative position and the cycle of operations of said camera and for automatically releasing said platen release means after an exposure by said camera.

6. In a photographic copying apparatus, the combination with a camera, a copy holder including a platen member movable to operative and inoperative positions, a means for holding said platen member in operative position, and a photosensitive device movable to an operative position in the path of movement of said platen member, of a platen control circuit including a member for operating said means to release said platen member for movement to its inoperative position and including a switch member closed only when said photosensitive device is out of the path of movement of said platen member.

7. In a photographic copying apparatus, the combination with a camera including a switch closed by operation of said camera to make an exposure, a copy holder including a platen member movable to operative and inoperative positions, a means for holding said platen member in operative position, and a photosensitive device movable to an operative position in the path of movement of said platen member, of a platen control circuit including a member for operating said means to release said platen member for movement to its inoperative position, a switch member closed only when said photosensitive device is out of the path of movement of said platen member, and including said camera operated switch.

8. In a photographic copying apparatus, the combination with a camera including a switch closed by operation of said camera to make an exposure, a copy holder including a platen member movable to operative and inoperative positions, a means for holding said platen member in operative position, and a photosensitive device movable to an operative position in the path of movement of said platen member, of a platen control circuit including a member for operating said means to release said platen member for movement to its inoperative position, a switch member closed only when said photosensitive device is out of the path of movement of said platen member, and including said camera operated switch, and a manually operable switch in said control circuit and adapted when closed to shunt said camera operated switch for release of said platen member independently of operation of said camera.

9. In a photographic copying apparatus, the combination with a camera including a switch closed by operation of said camera to make an exposure, a copy holder including a platen member movable to operative and inoperative positions, a means for holding said platen member in operative position, and a photosensitive device movable to an operative position in the path of movement of said platen member, of a platen control circuit including a member for operating said means to release said platen member for movement to its inoperative position, a switch member closed only when said photosensitive device is out of the path of movement of said platen member and including said camera-operated switch, and a manually operable switch in said control circuit for rendering the same inoperative.

10. In a photographic copying apparatus, the combination with a camera, a copy holder including a platen member movable to operative and inoperative positions, and an auxiliary device movable to an operative position in the path of movement of said platen member, of a camera control means responsive to movement of said auxiliary device to operative position and for rendering said camera inoperative.

11. In a photographic copying apparatus, the combination with a camera, a copy holder including a platen member movable to operative and inoperative positions, a means for holding said platen in operative position, and a photosensitive device movable to an operative position in the path of movement of said platen member and to an inoperative position out of said path, of a camera control circuit including a switch means closed by movement of said platen member to closed position and a switch assembly closed by movement of said photosensitive device to said inoperative position.

12. In a photographic copying apparatus, the combination with a camera, a copy holder including a platen member movable to operative and inoperative positions, a means for holding said platen in operative position, and a photosensitive device movable to an operative position in the path of movement of said platen member and an inoperative position out of said path, of a camera control circuit including a switch means closed by movement of said platen member to closed and operative position, a switch assembly closed by movement of said photosensitive device to said inoperative position, and a master switch for closing said camera control circuit.

ALVIN E. SCHUBERT.
ELMER O. WANGERIN.
JOHN F. EGAN.